United States Patent Office 3,519,596
Patented July 7, 1970

3,519,596
STABILIZED POLYETHYLENE SULFIDE COMPOSITIONS
Stuart M. Ellerstein, Trenton, N.J., assignor to Thiokol Chemical Corporation, Bristol, Pa., a corporation of Delaware
No Drawing. Filed Aug. 10, 1967, Ser. No. 659,585
Int. Cl. C08g 51/60
U.S. Cl. 260—45.75
22 Claims

ABSTRACT OF THE DISCLOSURE

Thiocyanate and selenocyanate compounds are used alone, and in conjunction with various other compounds, such as organic nitrogen compounds and certain inorganic metal oxides, as stabilizers for ethylene sulfide polymers to prevent the degradation of such polymers during the high temperature molding thereof into various molded articles, as well as to prevent degradation of the polymers during the subsequent use of such molded articles at the service temperatures employed during the use of such articles.

BACKGROUND OF THE INVENTION

This invention relates to improved ethylene sulfide polymer based moldable compositions and improved stabilizer systems therefore. More specifically, the present invention is concerned with the use of thiocyanate and selenocyanate compounds, alone, and in conjunction with other compounds, as stabilizers for moldable ethylene sulfide polymers.

Recent advances in the polymer field have provided solvent resistant ethylene sulfide polymers of high molecular weight for use as high temperature injection and extrusion molding materials. Because of their good solvent resistance and high temperature melting properties, these polymers can be processed by extrusion or injection molding techniques into a variety of useful products, such as pipe, film, filament, rods, bars, gears, pumps, valves and so forth. The vigorous conditions, i.e., time and temperature usually employed when molding such materials, however, may result in some degradation of the polymer during such molding operations by changes in the color of, and/or emission of odors from, and/or lowering of the melting point of, and/or poor melt flow characteristics of the polymer.

When the molded objects made from such polymers are used, moreover, they are commonly employed for long periods of time at temperatures above room temperature, i.e. above about 25° C., but below the melting point of polymers, i.e. below about 200–235° C. Such use conditions may also lead to some degradation of the polymers as evidenced by a deterioration or loss of physical properties in the molded articles during the use thereof at the various service temperatures employed. Such undesirable changes in the polymers and/or molded articles, if allowed to go unchecked, could seriously lessen the value of the molded end products and thereby limit the utility of the polymers and such products.

SUMMARY OF THE INVENTION

It is, therefore, an object of the present invention to provide stabilization systems and methods which will protect high molecular weight ethylene sulfide polymers against degradation during the high temperature molding thereof into useful molded articles.

Another object of the present invention is to provide stabilization systems which will protect articles molded from ethylene sulfide polymers from undergoing undue degradation during the use thereof.

These and other objects of the present invention are accomplished by adding to moldable ethylene sulfide polymer, prior to the molding thereof, a stabilizing system of a thiocyanate and/or selenocyanate compound(s) used alone, or optionally, in combination with various other compounds. More particularly, the present invention provides a composition comprising an admixture of solid ethylene sulfide polymer and a stabilizing system of a thiocyanate and/or selenocyanate compounds(s) and, optionally, other compounds as disclosed below.

By employing this particular stabilizing system, high molecular weight, moldable ethylene sulfide polymers can be protected against degradation at high molding temperatures and the resulting molded objects can be protected against degradation during the use thereof. Thus, the present invention allows for the processing of solid ethylene sulfide polymer by high temperature injection or extrusion molding operations and the use of the resulting molded objects at elevated temperatures, without the deleterious effects that might be otherwise encountered in such operations without the use of such stabilizers, so as to consistently give satisfactory end products.

DESCRIPTION OF THE PREFERRED EMBODIMENTS

The stabilizer system of this invention comprises at least one compound having the structure $M(XCN)_n$ wherein M is $NH_4$ or a metal, X is S or Se and $n$ is the valence of M. The metals which are used in such compounds include potassium, sodium, lithium, lead, and zinc. The compounds having the structure $M(XCN)_n$ as described above may be called thiocyanates when X is S and selenocyanates when X is Se. Examples of such compounds are ammonium thiocyanate, potassium thiocyanate, sodium thiocyanate, lithium thiocyanate, lead thiocyanate, zinc thiocyanate, ammonium selenocyanate, potassium selenocyanate, and sodium selenocyanate. The thiocyanate and selenocyanate compounds may be used alone or they may be used in combination with various other compounds in accordance with the teachings of the present invention. Other types of compounds which may be used with the thiocyanate and selenocyanate compounds include organic nitrogen compounds; inorganic metal oxides having the structure $$M'_{n'}O_n$$

wherein M' is a divalent, trivalent or tetravalent metal and $n'$ and $n$ are each 1 when M' is divalent, $n'$ is 3 and $n$ is 2 when M' is trivalent and $n'$ is 1 and $n$ is 2 when M' is tetravalent; and salts of dithiocarbamic acids.

When used alone or with other compounds, the thiocyanate and/or selenocyanate compounds are used in the amounts of about 0.1 to 5% by weight based on the weight of the polymer. The other compounds which may be used in combination with the thiocyanate and/or selenocyanate compounds according to the present invention, such as the organic, nitrogen compounds; inorganic metal oxides; and dithiocarbamic acid salts may each be used in amounts of about 0.01 to 5.0% by weight of the polymer.

The stabilizing compounds may be added to the polymer separately or they may be admixed prior to being added to the polymer. To be practically useful, the stabilizer system should be uniformly and completely dispersed throughout the polymer prior to the processing of the polymer.

Since the polymer molding or processing techniques employ relatively high temperatures usually ranging from about 215° to 270° C. or more, it is desirable that the stabilizer system, whether liquid or solid, be substantially non-volatile at the molding, i.e. processing, temperature used. For this reason, the stabilizer systems of the present and/or the components thereof should preferably have a boiling point(s) of at least about 200° C.

The inorganic metal oxide compounds which may be used in accordance with the present invention include compounds of divalent metals such as zinc, magnesium, and calcium; as well as compounds of trivalent metals such as aluminium; as well as compounds of tetravalent metals such as titanium. Such inorganic metal oxides would include ZnO, CaO, MgO, $Al_2O_3$ and $TiO_2$.

The dithiocarbamic acid salts which may be used according to the present invention are those having the structure

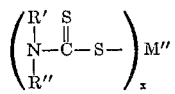

wherein M″ is $NH_4$ or a metal, $x$ is the valence of M″ and R′ and R″ may be the same or different and may be H, alkyl, aryl, cyclic alkylene, aralkyl or alkaryl. The metals which may be used in such salts include lead, tin, mercury, zinc, bismuth, nickel, copper, cadmium, magnesium, sodium, selenium and tellurium. Examples of such salts are lead dimethyl dithiocarbamate, zinc dibenzyl dithiocarbamate, nickel dibutyl dithiocarbamate, nickel dibutyl dithiocarbamate, tin (II) dimethyl dithiocarbamate, tin (IV) dimethyl dithiocarbamate, mercury (II) dimethyl dithiocarbamate, cadmium dimethyl dithiocarbamate, magnesium dimethyl dithiocarbamate, sodium dimethyl dithiocarbamate, dicyclohexyl ammonium dicyclohexyl dithiocarbamate, zinc dibenzyl dithiocarbamate, bismuth (III) dimethyl dithiocarbamate, selenium diethyl dithiocarbamate, tellurium diethyldithiocarbamate and copper (II) dimethyl dithiocarbamate.

The organic nitrogen compounds which may be used in the present invention include amides, amines, cyclic N-containing compounds and other N-containing compounds which function as amines, for example, ammonium salts of organic acids, e.g., ammonium benzoate.

Amides which may be used as stabilizers according to the present invention may be monomeric or polymeric in nature and should contain at least 5 carbon atoms. The polymeric amides may contain the amide groups in the backbone thereof, or the amide groups may be pendant to the polymeric backbone. Typical of such materials are caprolactam, adipamide, low molecular weight polyamides formed from hexamethylenediamine and adipic acid, acrylamide homopolymers and interpolymers; fatty acid polyamides; N,N-bis (hydroxyethyl)acrylamide; and adipoyldihydrazide and adducts or reaction products of methylene-bis-acrylamide and polyamines such as ethylene diamine and diethylene triamine.

Useful amines include monofunctional or polyfunctional amines in which the amine groups may be primary, secondary, or tertiary. Functional groups other than amine groups may also be present.

Monofunctional amines containing no other functional groups should contain at least eight carbon atoms and include aliphatic compounds such as n-octadecylamine and branched octadecyl - dimethylamine and aromatic compounds such as phenyl-B-naphthylamine and dibenzylamine.

Monofunctional amines containing other functional groups include hydroxyl-containing amines such as those having as structures:

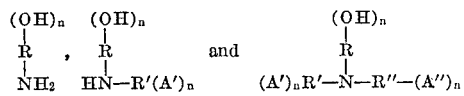

in which R, R′ and R″ may be the same or different hydrocarbon or oxyhydrocarbon groups, A′ and A″ are H or OH and $n$ is a whole number of at least 1. An R′ or R″ group may have more than one OH group.

Examples of such hydroxyl-containing amines are the following: diethanolamine, diisopropanolamine, diglycolamine ($HOCH_2CH_2OCH_2CH_2NH_2$), aminotris (hydroxymethyl) methane, N-(2-hydroxyethyl) cyclohexylamine, DL-2 benzylamino-1-propanol, phenylethyl-ethanolamine, m-tolyldiethanolamine and phenyldiethanolamine.

Polyfunctional amines include aliphatic tertiary amines such as N,N,N′,N′-tetrakis (ethyl)ethylenediamine, N,N,N′,N′-tetrakis (2-cyanoethyl) ethylenediamine; polyalkanol-polyamines such as N,N,N′,N′-tetrakis (2-hydroxyethyl) ethylenediamine, N,N,N′,N′-tetrakis (2-hydroxypropyl) ethylenediamine, and $$O=P-(NH-CH-CH_2OH)_3$$
$$\phantom{O=P-(NH-}CH_3$$

compounds having the structure A—NH(R—NH)$_n$A′ in which R is an alkylene, arylene, alkarylene, or aralkylene group, $n$ is a whole number of at least 1; A and A′ may be the same or different and may be

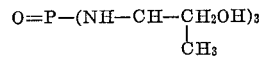

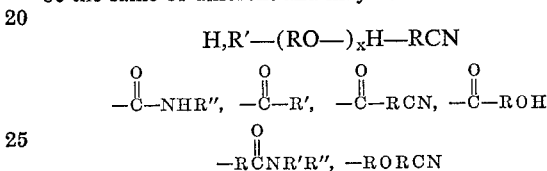

or

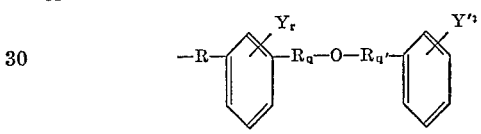

in which R is the same as above, R′ is an alkyl, cycloalkyl, aryl, alkaryl or aralkyl group, R′ is H or R′, $x$ is a whole number of 1 through 25, Y and Y′ may be the same or different and may be —R(NHR)$_n$—NH—A, —CH$_2$OH, or R′ in which A, R and R′ are the same as above $q$ and $q'$ are 0 or 1, $r$ is 0 or a whole number from 1 through 4, and $t$ is 0 or a whole number from 1 through 5. A limiting value for $x$ has been given because as the length of the polyether chain increases, the activity of the amine portion, which is believed to be the more active portion for stabilizing purposes, tends to diminish. However, no such limiting value has been given to the subscript $n$, since, regardless of the length of the polyamine chain, there does not appear to be any lessening of the activity of the amine function for stabilizing purposes.

Examples of polyfunctional amines which may be used according to the present invention are polyalkylene polyamines, such as, diethylene triamine, triethylene tetramine, tetraethylene pentamine, pentaethylene hexamine, dipropylene triamine, tri-1, 3-propylene tetramine, dibutylene triamine, tributylene tetramine, tetrabutylene pentamine, bis-(hexamethylene) triamine; N(B hydroxyethyl)diethylene triamine; p-aminodiphenylamine, dibenzyl ethylene diamine, N,N′-bis(2-aminoethyl)-4,4′-oxydibenzylamine, p-phenylenediamine, bis(p-ethylamine) diphenylamine poly (alkylene imines), such as poly(ethyleneimine); adducts of alkylene oxides and polyalkylene polyamines such as an adduct of ethylene oxide or propylene oxide and tetraethylene pentamine, diethylene triamine or dipropylene triamine; adducts of polymerized alkylene imines and alkylene or aryl oxides such as adducts of polymerized ethyleneimine or ethylenediamine and styrene oxide; adducts of alkylene or polyalkylene polyamines and unsaturated nitriles, such as, adducts of ethylenediamine or diethylene triamine and acrylonitrile; adducts of polyalkylene polyamines and alkyl halides, such as, adducts of tetraethylene pentamine and n-octyl chloride; adducts of polyalkylene polyamines and alkyl or aryl isocyanates, such as adducts of tetraethylenepentamine and phenyl or ethyl isocyanate; alkylene diureas such as 1,1′-ethylenediurea; adducts of unsaturated amides and alkylene or polyalkylene polyamines, such as, an adduct of ethylenediamine and acrylamide; adducts of alkylene or polyalkylene polyamines and diphenyl oxide; adducts of alkylene or polyalkylene polyamines and chloromethylated diphenyl oxides such as the ethylene diamine or diethylenetriamine adduct of chloromethylated diphenyl oxide.

Compounds containing nitrogen in a ring structure include: tris - (2 - methylaziridinyl)triazine; tripropyleneimine melamine; phthalazine;

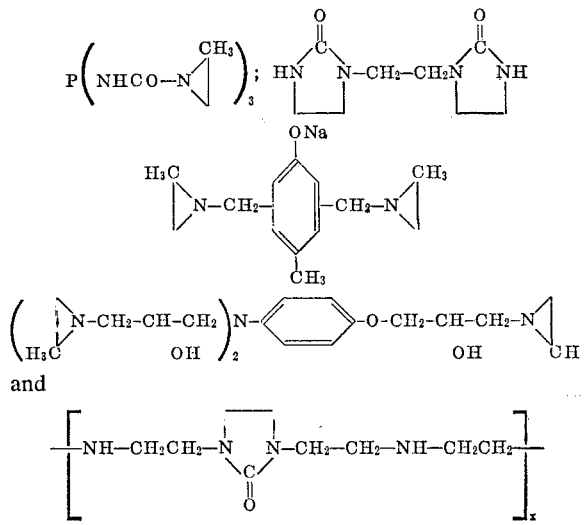

and

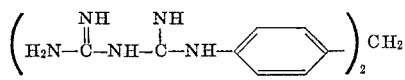

Other nitrogen containing compounds which may be used according to the present invention include:

Adducts or reaction products of P(NCO)$_3$ and polyalkylene polyamines such as diethylene triamine and triethylene tetramine;

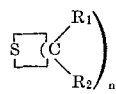

and adducts of 2,5-hexanedione and alkylene polyamines such as ethylene diamine and triethylene tetramine.

The solid, high molecular weight moldable ethylene sulfide polymers which may be treated with the stabilizers according to the present invention may be homopolymers or they may be interpolymerization products which contain a major portion of ethylene sulfide and a minor portion of one or more other interpolymerizable monomers. Such other interpolymerizable monomers include:

(A) Vicinal episulfide monomers such as styrene sulfide and alkylene sulfides such as propylene sulfide, 1,2-butylene sulfide, 2,3-butylene sulfide, isobutylene sulfide, cyclohexene sulfide, vinyl cyclohexane sulfide, 2-benzylthiirane, paramethyl styrene episulfide, allyl thioglycidyl ether, thioglycidyl acrylates, thioglycidyl alkaacrylates such as thioglycidyl methacrylate, vinyl cyclohexene episulfide, butadiene monoepisulfide and 1,2-epoxy-3,4-epithiobutane;

(B) Cyclic organic sulfides having the structure $$\left[ \begin{array}{c} S \\ \end{array} \left( C \begin{array}{c} R_1 \\ R_2 \end{array} \right) \right]_n$$

where $n=3$ to 6 and R$_1$ and R$_2$ may be H, a lower, branched or linear alkyl group having from 1 to 10 carbon atoms, an aryl, an arylalkyl and/or an alkylaryl group, and R$_1$ or R$_2$ may also be heterocyclic, alicyclic, bicyclic or polycyclic; examples of such cyclic sulfides are trimethylene sulfide, pentamethylene sulfide and hexamethylene sulfide;

(C) Compounds containing ethylenic unsaturation, i.e.,

such as olefins, such as ethylene, propylene, butylene and isobutylene; conjugated and non-conjugated dienes, such as butadiene, isoprene and 1,4-pentadiene; and vinyls, such as styrene, vinyl acetate, ethyl acrylate, methyl acrylate, methyl methacrylate, butyl acrolate, acrylonitrile, vinyl isobutyl ether, α=methyl styrene, hydroxypropyl methacrylate, tetrafluoroethylene, chlorotrifluoroethylene and hexafluoropropylene;

(D) Compounds having the structure

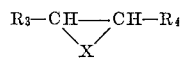

in which X is O or N and R$_3$ and R$_4$ may be H, a lower branched or linear alkyl group having from 1 to 10 carbon atoms, an aryl, aralkyl, and/or alkaryl group, and R$_3$ or R$_4$ may also be heterocyclic, alicyclic, bicyclic or polycyclic; examples of such compounds are styrene oxide, ethylene oxide, propylene oxide, 1,2-butylene oxide, 2,3-butylene oxide, ethylene imine and propylene imine; and (E) Other compounds such as formaldehyde, trioxane, hydroxyisobutyric acid, tetrahydrofuran, 1,3-dioxolane, 1,4-dioxane, trimethylene oxide, tetramethylene oxide and pentamethylene oxide.

These ethylene sulfide polymers may be prepared using a variety of polymerization catalysts under a variety of polymerization conditions. Useful polymerization catalysts include composite materials or the reaction product of two components. One component is an organometallic compound of the formula R$_2$M, wherein R is alkyl or aryl and M is zinc, cadmium or mercury. The second component, can be generally characterized as having at least one pair of unshared electrons; all substances of this type do not have the same degree of utility as a second component. One group that is especially useful comprises compounds having an active hydrogen atom including, for example, water; hydrogen sulfide; primary and secondary alkylamines; e.g., methyl, ethyl and diethyl amines; alkanols, e.g. mercaptoethanol; acetone; lower fatty acids, e.g. acetic acid; and aldehydes, e.g., butyraldehyde. Additionally, catalysts employing as the second component or co-catalyst elemental oxygen or sulfur, carbonyl sulfide and carbon disulfide are useful. A typically, useful catalyst includes the reaction product of diethyl zinc and water.

These composite polymerization catalysts may be prepared by reacting the two components in a suitable inert liquid reaction medium, benzene, hexane, tetrahydrofuran, petroleum, ether or mineral oil, employing a molar ratio of co-catalyst to organometallic component in the range of about 0.5:1 to 3:1. Reaction temperatures may vary from about —20° C. to 100° C.

For more satisfactory catalyst activity and desirable polymer properties, freshly prepared catalyst should be used. The catalyst may be prepared directly in the polymerization reaction vessel prior to or coincident with the initiation of the polymerization reaction. If it is necessary to store the catalyst for an appreciable period of time before it is used, say 48 hours or more, the prepared catalyst can best be maintained by storage at low temperatures.

Since oxygen or water may function as co-catalysts, the catalyst preparation reactions and the polymerization reactions should be carried out in an oxygen and water free environment; except in the cases when these substances are used as catalyst components. Catalyst preparation reactions and polymerization reactions are generally conducted in an atmosphere of inert gas, such as, nitrogen, helium or argon.

The polymerization is generally carried out by any of the wide variety of polymerization techniques whereby the monomer or monomers are contacted with the catalyst. It is preferable, in order to obtain optimum results, that the starting monomeric materials be freshly distilled just prior to use from a reducing agent, e.g., calcium hydride, to remove oxidation products and water therefrom. A catalyst concentration with the ranges of about 0.05 to 3% by weight of the monomer mixture is useful. The polymerization reaction temperature is equally within the range of about −20° C. to 150° C.

Polymerizations may be conducted in any of various bulk, solvent, solution, vapor phase, or other polymerization techniques conventionally employed. Solvent polymerization techniques are especially useful, and typical solvents for this purpose include aromatic hydrocarbons, e.g., benzene, toluene or xylene; aliphatic hydrocarbons, e.g., isopentane, n-hexane or octane; chlorinated hydrocarbons, e.g., carbon tetrachloride, methylene chloride or ethylene chloride; ethers, e.g., diethyl ether, dioxane, or tetrahydrofuran.

Homopolymers and interpolymers of a more granular nature than those prepared as described above and which have better handling properties may be produced using a "seed catalyst" system. In the "seed catalyst" procedure the organometallic compound/co-catalyst material (in about 1:1 mol ratio) is used to polymerize the episulfide monomer charge in solution at room temperature. About 0.05 to 10 mol percent catalyst based on the monomer charge is used. Solution polymerization with solvents as tetrarydrofaran, petroleum ether, benzene and toluene is used. The resultant polymerization product contains all the catalyst initially charged. The polymer product is then recovered, dried, and converted to a granulated polymer product having particles of less than about 20 mesh in size. The granulated polymer product containing the original catalyst charge is a "seed catalyst" which may be used to polymerize ethylene sulfide alone or with other monomers to form granular powders. About 1 to 5% by weight of the seed catalyst is used based on the monomer charge. The seed catalyst based polymerization is generally conducted at temperatures of about 170° F. to 185° F. for about one to three hours. The yields of the granular polymer obtained are about 80–100%. The seed catalyst polymer and the polymer produced therewith have essentially the same chemical characteristics, and they may be used in subsequent molding operations without separating one from the other.

Other catalysts, useful in the preprtion of moldable ethylene sulfide polymers include cadmium compounds such as hydroxides, sulfides, silicates, chromates, adipates, sulfates and carbonates; zinc or mercury compounds such as peroxides, sulfides, chromates, adipates, oxalates, oxides, hydroxides and carbonates; carbonates of zinc, manganese, lead, cadmium, cobalt and nickel; oxides of metals such as $Na_2O$; $Na_2O_2$; $MgO$; $Al_2O_3$; $K_2O$, $K_2O_2$; $CaO$, $CaO_2$; $FeO_3$; $CoO$; $NiO$; $SrO$, $SrO_2$; $SnO$, $SnO_2$, $Sb_2O_3$; $BaO$, $BaO_2$; $PbO$, $PbO_2$ and $Bi_2O_3$. Other catalyst systems also useful in the preparation of moldable polymers which may be stabilized according to the present invention include Friedel-Crafts catalysts such as sulfuric acid and boron trifluoride; ionizing radiation; sodium naphthenate; sodium cyanide; metal alkyls such as butyl lithium and metallic sodium dispersions.

The catalysts mentioned above may be used in a variety of polymerization procedures to produce ethylene sulfide homopolymers or graft, random or block interpolymers of ethylene sulfide and one or more monomers interpolymerizable therewith.

The following examples are merely illustrative of the present invention and are not intended as a limitation upon the scope thereof.

EXAMPLE A

Preparation of polymer (A) *Preparation of seed catalyst.*—Under a nitrogen atmosphere the following reactants were added, in the order presented, into a 2½ gallon solution bottle: 2835 ml. of tetrahydrofuran and sufficient diethyl zinc to effect a 1:1 mol ratio with 9.838 ml. of water added subsequent to the diethyl zinc. The materials were agitated by sparging with nitrogen. Into a second vessel, a clean dry reactor, purged with nitrogen, 51.9 pounds of petroleum ether was added and then charged with 6.49 pounds of ethylene sulfide. The temperature of the reactor was then adjusted to 78± 2° F. and the entire above prepared solution of tetrahydrofuran, diethyl zinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass thru a #40 screen. A yield of 1.3 pounds of seed catalyst polymer was thereby obtained.

(B) *Preparation of the polymer.*—A suitable sized reactor was purged with nitrogen for 15 minutes and charged with 120 pounds of petroleum ether and 60.1 pounds of ethylene sulfide in the order presented. An additional 50 pounds of petroleum ether was then charged into the reactor to completely flush the ethylene sulfide from the charging lines into the reactor. The seed catalyst, prepared in A. above, was then charged ito the reactor, the nitrogen shut off, the reactor sealed and the temperature raised to 176±5° F. in 1½ hours. The reaction was continued at this temperature for two additional hours. The polymerized mass and solvent was then cooled to less than 100° F., separated by centrifuging and dried under reduced pressure for four hours at about 190° F. A yield of about 80% was obtained.

EXAMPLE B

Preparation of stabilized composition

Various combintion of stabilizers, according to the present invention, and ethylene sulfide polymer, prepared as in Example A above, were blended together and molded into test bars in order to test the physical properties of such test bars and thus evaluate the stabilizer systems used therein. The components of each of the test compositions were blended together in a Waring Blender at high speed for about three minutes in 30 second increments to avoid heat buildup.

EXAMPLE C

Molding of the test samples

The control samples of polymer alone, and the blended compositions of polymer and stabilizer prepared as disclosed in Example B above, were each injection molded into test bars. For the molding operation there was used a Van Dorn (Cleveland, Ohio) injection molding device, Model 50–RS–3, having a shot capacity of three ounces (avoir dupois) of polystyrene. In preparing the molded specimens the test composition is charged into the molding device and allowed to pass through three heating zones over a 3 to 5 minute period in order to gradually build up the temperature of the test composition and prepare a molten system for the molding step. The three zones and their respective barrel temperatures are feed zone, 345±150° F.; middle or compression zone, 380±10° F.; and front or metering zone, 410±10° F. From the front or metering zone the now molten composition is injected into a mold and molded over a 66.5 second cycle that includes injection into the mold at 410±10° F., holding in the mold at 195±10° F., and ejection of the molded piece from the mold. Prior to being tested for physical properties as described in Example D below the molded specimens are cooled at room temperature, i.e., about 25° C., in the atmosphere for at least 24 hours prior to testing.

Two types of test bars may be made. One bar be made for use in the Izod impact resistance test in accordance with ASTM D–256–56 (1964) and the other may be made for use in the testing for tensile properties in accordance with ASTM D–638–64T (1964). The dimensions for the test bar specimens are set forth in the ASTM regulations. In preparing the test bars for use in the tests reported below the test bar specimens for use in the tensile property test procedures was made using a 6½″ (overall length) test bar having 4″ between the gripping points.

EXAMPLE D

Testing of the test specimens

After being cooled at room temperature for at least 24 hours, the test specimens made as disclosed in Example C above were then tested for various physical properties in order to evaluate the stabilizer systems used therein. The evaluation of the stabilizer systems was programmed so as to demonstrate the utility of the stabilizer for the purpose of preventing or retarding deterioration in the physical properties of molded articles prepared therewith when such molded articles are exposed to air at elevated temperatures for prolonged periods of time. The test samples, therefore, were aged in a heated circulating air oven at elevated temeratures of about 120–150° C. for various periods of time before the physical properties of such specimens were ascertained. This aging process is intended to simulate environments that might be encountered by articles molded from ethylene sulfide polymers under certain use conditions, such as during the use of molded automobile engine parts.

The test procedures of ASTM D–638–64T (1964) were used for the evaluation of tensile (reported in pounds per square inch), elongation (reported in percent) and modulus (reported in foot-pounds per inch of notch) properties.

The test procedures of ASTM D–256–56 (1964) were used for the evaluation of impact resistance properties (reported in foot-pounds/inch) with no allowance being made for a "toss factor."

Each of the test results reported is the average of 3 to 5 tests.

EXAMPLES 1 TO 18

Various formulations containing various stabilizer systems containing KSeCN and ethylene sulfide polymer were prepared and evaluated. The polymer was made as disclosed in example A and the formulations were prepared and molded as disclosed in Examples B and C. The molded specimens were made for testing in accordance with ASTM D–638–64T (1964) and aged at 121° C. as disclosed in Example D.

The physical properties were ascertained both initially, i.e., prior to the elevated temperature aging study, as well as at the end of various stated time periods during the aging study. A number of samples of each molded formulation were prepared at the same time, and simultaneously aged, so as to allow for a different set of 3 to 5 of such samples to be tested at the stated time period during the aging study.

The formulations thus evaluated and the physical results obtained upon testing the molded and aged specimens are disclosed below in Table I. These tests results show that the molded specimens made with the stabilizer systems of the present invention retain the evaluated physical properties for longer periods of time than unstabilized specimens or specimens stabilized with amines alone.

TABLE I

| Example | Formulation tested [1] | Test Procedure [2] | Physical Properties of molded specimens days/air at 121° C. (250° F.) | | | |
|---|---|---|---|---|---|---|
| | | | Initial | 1 | 4 | 19 |
| 1 | Polymer alone, no additive | (a) | 8,790 | 6,240 | 2,600 | 1,900 |
| | | (b) | 3.48 | 1.68 | 0.62 | 0.45 |
| | | (c) | 390 | 460 | 430 | 408 |
| 2 | 3.0% dibenzylamine | (a) | 10,162 | 7,828 | 2,278 | 2,229 |
| | | (b) | 13.6 | 3.60 | 0.94 | 1.13 |
| | | (c) | 300 | 343 | 300 | 257 |
| 3 | 0.5 KSeCN | (a) | 10,110 | 10,942 | 10,871 | 8,398 |
| | | (b) | 6.71 | 4.44 | 5.07 | 3.03 |
| | | (c) | 354 | 401 | 397 | 403 |
| 4 | 1.0 KSeCN | (a) | 10,055 | 10,152 | 9,950 | 9,891 |
| | | (b) | 6.82 | 4.40 | 4.12 | 4.13 |
| | | (c) | 354 | 401 | 397 | 403 |
| 5 | 1.5 KSeCN | (a) | 9,150 | 9,531 | 9,802 | 9,277 |
| | | (b) | 5.36 | 4.23 | 4.28 | 3.66 |
| | | (c) | 336 | 371 | 382 | 420 |
| 6 | 2.0 KSeCN | (a) | 9,128 | 9,691 | 9,929 | 9,129 |
| | | (b) | 5.30 | 4.11 | 4.39 | 3.61 |
| | | (c) | 343 | 413 | 377 | 416 |
| 7 | 1.0% KSeCN, 3.0% dibenzylamine | (a) | 9,971 | 10,245 | 9,461 | 7,182 |
| | | (b) | 19.31 | 8.20 | 6.52 | 4.05 |
| | | (c) | 285 | 312 | 293 | 367 |
| 8 | 1.0% KSeCN, 3.0% dibenzylamine, 0.2% ZnO | (a) | 9,873 | 10,548 | 10,167 | 7,992 |
| | | (b) | 14.02 | 8.84 | 8.49 | 5.06 |
| | | (c) | 273 | 307 | 272 | 300 |
| 9 | 1.0% KSeCN, 3.0% dibenzylamine, 0.2% CaO | (a) | 10,173 | 10,407 | 9,901 | 6,901 |
| | | (b) | 14.21 | 8.00 | 6.97 | 3.66 |
| | | (c) | 260 | 337 | 315 | 305 |
| 10 | 1.0% KSeCN, 3.0% dibenzylamine, 0.2% MgO | (a) | 9,827 | 9,966 | 10,061 | 6,072 |
| | | (b) | 14.78 | 7.26 | 7.48 | 3.13 |
| | | (c) | 288 | 307 | 310 | 290 |
| 11 | 1.0% KSeCN, 3.0% dibenzylamine, 0.2% TiO$_2$ | (a) | 10,034 | 10,435 | 10,132 | 5,292 |
| | | (b) | 15.10 | 8.95 | 8.50 | 2.69 |
| | | (c) | 278 | 310 | 288 | 258 |
| 12 | 1.0% KSeCN, 3.0% A-202, 0.2% ZnO | (a) | 11,130 | 11,080 | 11,075 | 7,984 |
| | | (b) | 12.57 | 8.29 | 7.06 | 4.07 |
| | | (c) | 285 | 332 | 355 | 340 |
| 13 | 1.0% KSeCN, 3.0% A-202[1], 0.2% CaO | (a) | 10,243 | 11,508 | 11,203 | 7,885 |
| | | (b) | 10.17 | 7.78 | 6.92 | 4.12 |
| | | (c) | 293 | 318 | 347 | 307 |
| 14 | 1.0% KSeCN, 3.0% A-202[1], 0.2% MgO | (a) | 10,299 | 11,475 | 10,352 | 6,085 |
| | | (b) | 12.31 | 8.70 | 6.06 | 2.74 |
| | | (c) | 303 | 338 | 363 | 343 |
| 15 | 1.0% KSeCN, 3.0% dibenzylethylene diamine, 1.0% phenyl-B-naphthylamine | (a) | 9,599 | 10,598 | 10,417 | 8,185 |
| | | (b) | 21.17 | 11.98 | 10.04 | 5.93 |
| | | (c) | 248 | 272 | 280 | 257 |
| 16 | 1.0% KSeCN, 3.0% dibenzylethylene diamine, 2.0% phenyl-B-naphthylamine | (a) | 9,800 | 10,757 | 10,341 | 8,821 |
| | | (b) | 21.54 | 12.29 | 9.90 | 6.29 |
| | | (c) | 228 | 290 | 267 | 290 |
| 17 | 1.0% KSeCN, 3.0% dibenzylethylene diamine, 1.0% phenyl-B-naphthylamine 0.2% ZnO | (a) | 9,778 | 10,188 | 10,133 | 9,295 |
| | | (b) | 24.36 | 10.61 | 9.98 | 7.45 |
| | | (c) | 247 | 260 | 257 | 257 |
| 18 | 1.0% KSeCN, 3.0% A-202,[3] 1.0% phenyl-B-naphthylamine, 0.2% ZnO | (a) | 10,581 | 11,261 | 11,075 | 9,828 |
| | | (b) | 17.25 | 9.68 | 8.28 | 5.85 |
| | | (c) | 283 | 327 | 327 | 340 |

[1] Polymer plus percent by weight of listed additive.
[2] (a)=tensile, p.s.i.; (b)=elongation percent; (c)=modulus/$10^3$.
[3] A-202=N,N′—bis—(2 amino ethyl)—4,4′—oxydibenzyl amine.

EXAMPLES 19 TO 22

Various formulations containing various stabilizer systems containing KSCN and ethylene sulfide polymer were prepared and evaluated. The polymer was made as disclosed in Example A and molded as disclosed in Examples B and C. The molded specimens were made for testing in accordance with ASTM D–638–64T (1964) and aged at 121° C. as disclosed in Example D. The physical properties were ascertained initially and after aging as disclosed in Examples 1 to 18. The formulations thus evaluated and the physical results obtained upon testing the molded and aged specimens are disclosed below in Table II. These tests results show that the molded specimens made with the stabilizer systems of the present invention retain the evaluated physical properties for longer periods of time than unstabilized specimens stabilized with amines alone.

having the structure $M(XCN)_n$ wherein M is selected from the group consisting of $NH_4$, Li, Na, K, Pb and Zn, X is selected from the group consisting of S and Se, and $n$ is the valence of M.

2. A composition as in claim 1 in which X is Se.
3. A composition as in claim 2 in which M is K and $n$ is 1.
4. A composition as in claim 2 in which M is Na and $n$ is 1.
5. A composition as in claim 1 in which X is S.
6. A composition as in claim 5 in which M is K and $n$ is 1.
7. A composition as in claim 5 in which M is Na and $n$ is 1.
8. A composition as in claim 5 in which M is $NH_4$ and $n$ is 1.
9. A composition as in claim 1 which further com-

TABLE II

| Example | Formulation tested [1] | Test Procedure [2] | 0 | 1 | 4 | 10 |
|---|---|---|---|---|---|---|
| 1 | Polymer alone, no additive | (a) | 8,790 | 6,240 | 2,600 | 1,900 |
|   |                            | (b) | 3.48  | 1.68  | 0.62  | 0.45 |
|   |                            | (c) | 390   | 460   | 430   | 408 |
| 2 | 3.0% dibenzylamine | (a) | 10,162 | 7,828 | 2,278 | 2,229 |
|   |                    | (b) | 13.6   | 3.60  | 0.94  | 1.13 |
|   |                    | (c) | 300    | 343   | 300   | 257 |
| 19 | 1.0% KSCN | (a) | 7,080 | 6,450 | 4,651 | 3,270 |
|    |           | (b) | 2.79  | 2.03  | 1.29  | 0.81 |
|    |           | (c) | 373   | 443   | 419   | 443 |
| 20 | 1.0% KSCN, 3.0% dibenzylamine | (a) | 10,018 | 8,253 | 4,304 | 2,714 |
|    |                                | (b) | 18.95  | 4.57  | 1.61  | 0.98 |
|    |                                | (c) | 273    | 315   | 313   | 317 |
| 21 | 1.0% KSCN, 4.0% pentaethylene hexamine | (a) | 9,513 | 8,926 | 7,182 | [3] 4,580 |
|    |                                         | (b) | 12.51 | 5.17  | 3.35  | [3] 310 |
|    |                                         | (c) | 293   | 321   | 346   | [3] 325 |
| 22 | 1.0% KSCN, 2.0% pentaethylene hexamine, 2.0% A-202 | (a) | 9,832 | 9,035 | 6,116 | [3] 3,839 |
|    |                                                     | (b) | 12.34 | 5.09  | 252   | [3] 1.28 |
|    |                                                     | (c) | 297   | 324   | 343   | [3] 339 |

[1] Polymer plus percent by weight of listed additive.
[2] (a)=tensile, p.s.i., (b)=elongation, percent, (c)=modulus/$10^3$.
[3] 14 day test period.

EXAMPLES 23 TO 27

Various formulations containing various stabilizer systems containing $NH_4SCN$ or KSCN and ethylene sulfide polymer were prepared and evaluated. The polymer was made as disclosed in Example A and the formulations were prepared and molded as disclosed in Examples B and C. The polymer used in Examples 23 to 27 was from a different batch than that used in Examples 1 to 22. The molded specimens were made for testing in accordance with ASTM D–256–56 (1964) and aged at 121° C. as disclosed in Example D. The physical properties were ascertained initially and after aging as disclosed in Examples 1 to 18. The formulations thus evaluated and the physical results obtained upon testing the molded and aged specimens are disclosed below in Table III. These test results show that the molded specimens made with the stabilizer systems of the present invention retain the evaluated physical properties for longer periods of time than unstabilized specimens or specimens stabilized with amines alone.

prises, as a component of said stabilizing system, at least one organic nitrogen compound selected from the group consisting of (1) amides containing at least 5 carbon atoms; (2) monofunctional, unsubstituted aliphatic amines containing at least 8 carbon atoms; (3) monofunctional hydroxyl-containing amines having the structures:

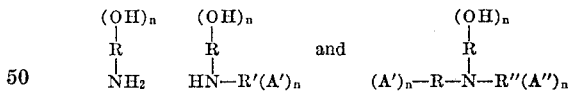

where R, R' and R'' are hydrocarbon or oxyhydrocarbon groups, A' and A'' are H or OH, and $n$ is a whole number of at least 1; and (4) polyamines having the structure $A-NH(-R-NH)_n A'$ in which R is selected from the group consisting of alkylene, arylene, alkarylene and aralkylene groups; $n$ is a whole number of at

TABLE III

| Example | Formulation tested [1] | Initial | 1 | 4 | 7 | 10 | 28 | 105 |
|---|---|---|---|---|---|---|---|---|
| 23 | Polymer alone, no additive | 1.20 | 0.66 | 0.30 | 0.21 | 0.23 | | |
| 24 | 2.0% EDA | 1.27 | 0.29 | 0.43 | 0.32 | 0.31 | | |
| 25 | 2.0% EDA, 0.2% $NH_4SCN$ | 0.99 | 0.50 | 0.45 | 0.43 | 0.48 | | |
| 26 | 4.0% Penten, 3.0% KSCN | 1.23 | 0.66 | 0.51 | | 0.59 | 0.56 | 0.56 |
| 27 | 4.0% Penten, 2.0% KSCN | 1.16 | 0.53 | 0.48 | | 0.51 | 0.42 | 0.49 |

Izod Break Energy (ft.-lbs./in.) day/air/121° C.

[1] Polymer plus percent by weight of listed additive.
EDA = ethylene diamine.
Penten = pentaethylene tetramine.

What is claimed is:

1. A composition comprising an admixture of solid, ethylene sulfide polymer and a stabilizing system for said polymer which comprises at least one compound least 1; A and A' are selected from the group consisting of

and

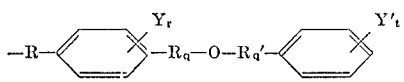

in which R is the same as above, R' is selected from the group consisting of alkyl, aryl, alkaryl and aralkyl groups; R'' is selected from the group consisting of H and R'; $x$ is a whole number from 1 through 25; Y and Y' are selected from the group consisting of $$-R(NHR)_nNH-A-CH_2OH$$

and R' in which A, R, and R' are the same as above; $q$ and $q'$ are 0 or 1; $r$ is 0 or a whole number from 1 through 4; and $t$ is 0 or a whole number from 1 through 5.

10. A composition as in claim 9 in which X is Se.

11. A composition as in claim 9 in which X is S.

12. An article molded from the composition of claim 1.

13. An article molded from the composition of claim 18.

14. An article molded from the composition of claim 19.

15. An article molded from the composition of claim 20.

16. An article molded from the composition of claim 21.

17. An article molded from the composition of claim 22.

18. A composition as in claim 10 in which M is K and $n$ is 1.

19. A composition as in claim 11 in which M is K and $n$ is 1.

20. A composition as in claim 11 in which M is $NH_4$ and $n$ is 1.

21. A composition as in claim 1 which further comprises, as a component of said stabilizer system, at least one metal oxide selected from the group consisting of ZnO, CaO, MgO, $Al_2O_3$ and $TiO_2$.

22. A composition as in claim 18 which further comprises, as a component of said stabilizer system, at least one metal oxide selected from the group consisting of ZnO, CaO, MgO, $Al_2O_3$ and $TiO_2$.

References Cited

UNITED STATES PATENTS

| | | | |
|---|---|---|---|
| 2,923,694 | 2/1960 | Schmidt | 260—45.7 |
| 3,365,431 | 1/1968 | Gobran | 260—45.7 |
| 3,409,565 | 11/1968 | Lal | 260—79.7 |
| 3,409,599 | 11/1968 | Bauer | 260—45.75 |

DONALD E. CZAJA, Primary Examiner

V. P. HOKE, Assistant Examiner

U.S. Cl. X.R.

260—45.1, 45.9, 79.1